US011830128B1

(12) United States Patent
Good

(10) Patent No.: US 11,830,128 B1
(45) Date of Patent: Nov. 28, 2023

(54) SYSTEMS AND METHODS FOR PRESENTING AND EDITING SELECTIONS OF THREE-DIMENSIONAL IMAGE DATA

(71) Applicant: Illuscio, Inc., Culver City, CA (US)

(72) Inventor: Max Good, Los Angeles, CA (US)

(73) Assignee: Illuscio, Inc., Culver City, CA (US)

( * ) Notice: Subject to any disclaimer, the term of this patent is extended or adjusted under 35 U.S.C. 154(b) by 8 days.

(21) Appl. No.: 18/163,683

(22) Filed: Feb. 2, 2023

(51) Int. Cl.
*G06T 19/20* (2011.01)
*G06T 15/50* (2011.01)
*G06F 3/0482* (2013.01)
*G06V 10/764* (2022.01)

(52) U.S. Cl.
CPC ............ *G06T 15/50* (2013.01); *G06F 3/0482* (2013.01); *G06V 10/764* (2022.01)

(58) Field of Classification Search
CPC .............. G06T 19/20; G06T 2200/04; G06T 2207/20092; G06T 19/00; G06T 15/08; G06T 15/50; G06T 15/20; G06T 2207/10028; G06T 2210/62; G06F 3/04847; G06F 40/166
See application file for complete search history.

(56) References Cited

U.S. PATENT DOCUMENTS

2014/0160128 A1* 6/2014 Cheung ................. G06T 17/05
345/424

OTHER PUBLICATIONS

"Leica Cyclone Basic User Manual", C.R. Kennedy & Company, Sep. 2017, 91 pages.

* cited by examiner

*Primary Examiner* — Hau H Nguyen
(74) *Attorney, Agent, or Firm* — Ansari Katiraei LLP; Arman Katiraei; Sadiq Ansari

(57) ABSTRACT

Disclosed is a system for differentiating the selection of three-dimensional ("3D") image data in a 3D space from other unselected 3D image data that may be positioned in front of the selected 3D image data, and for customizing editing operations that are presented in a user interface based on the object or material property represented in the selection. The system selects a set of 3D image data in response to a user input, and adjusts the transparency of unselected 3D image data that is positioned in front of the selected set of 3D image data. The system presents a differentiated visualization by rendering the selected set of 3D image data according to an original size, position, and visual characteristics defined for the selected set of 3D image, and by performing a partial or fully transparent rendering of the unselected 3D image as a result of the transparency adjustment.

20 Claims, 10 Drawing Sheets

US 11,830,128 B1

SYSTEMS AND METHODS FOR PRESENTING AND EDITING SELECTIONS OF THREE-DIMENSIONAL IMAGE DATA

BACKGROUND

Three-dimensional ("3D") images and 3D file formats contain image data that is distributed across 3 dimensions. The 3D distribution of image data complicates how a user selects, views, and interacts with a subset of the 3D image data on a two-dimensional ("2D") display or user interface. For instance, the selection of 3D image data in a first plane may be obscured by the presence of 3D image data in a second plane that is in front of the first plane. Accordingly, methods for identifying selections of 2D image data do not apply or are not effective in presenting selections of 3D image data. Even once a selection of 3D image data is made, interacting with or editing that selection is complicated by the extensive listing of tools, functions, and effects that may be applied to the selection or to 3D image data and that often overwhelm a novice or beginning user.

DETAILED DESCRIPTION OF PREFERRED EMBODIMENTS

Figure 1:
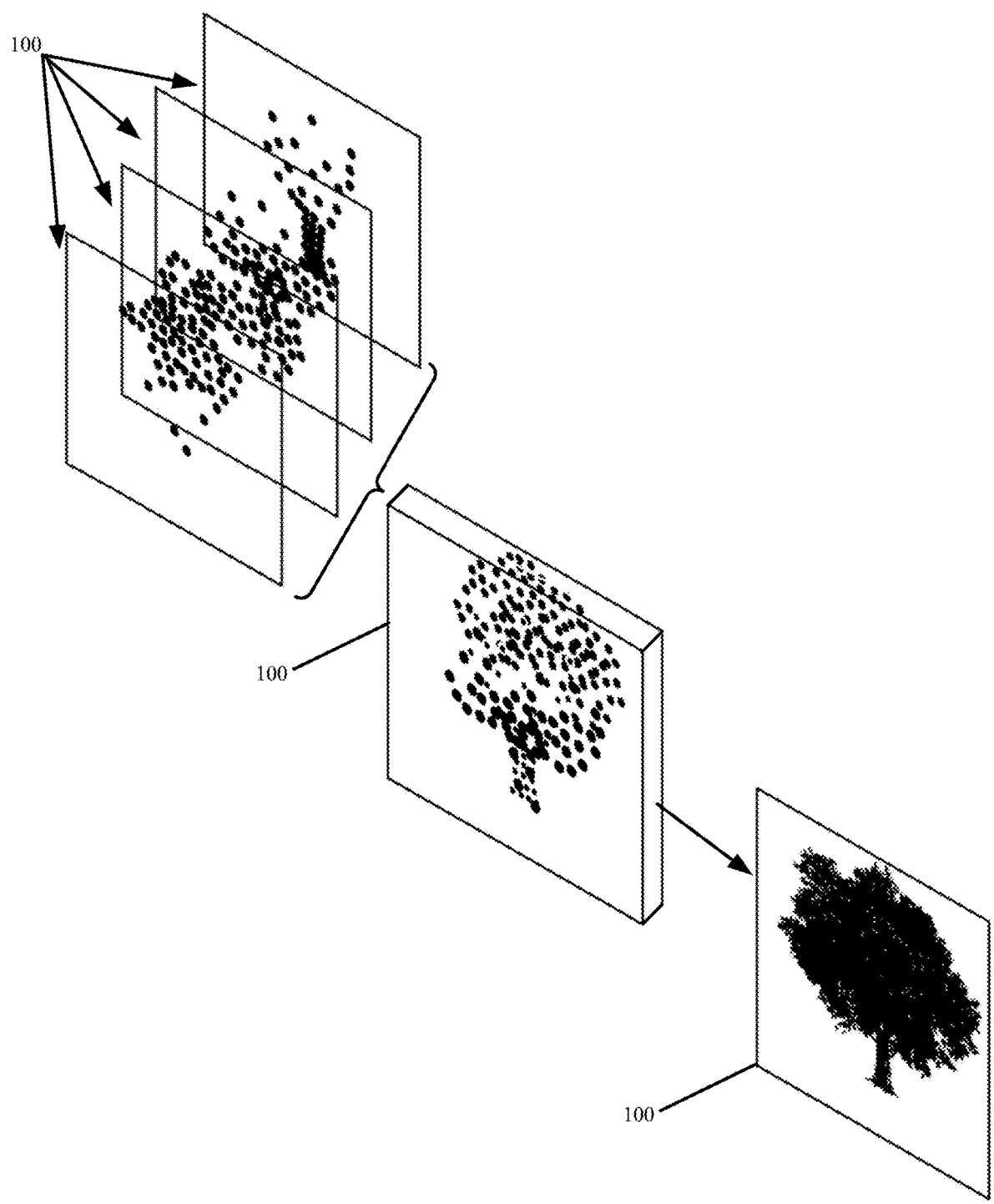
FIG. 1 illustrates an example point cloud with non-uniformly distributed data points or three-dimensional ("3D") constructs in accordance with some embodiments presented herein.

The following detailed description refers to the accompanying drawings. The same reference numbers in different drawings may identify the same or similar elements.

Provided are systems and methods for presenting and editing selections of three-dimensional ("3D") image data. Presenting the selected 3D image data includes presenting image data that is selected across multiple planes in a manner that does not change the positioning, sizing, or visual characteristics of the selected image data and that is not obscured by unselected image data that is in a closer plane to the view frustum than the selected image data or that surrounds the selected image data in the view frustum. Editing the selected 3D image data includes changing the tools, functions, and/or effects that are presented in a user interface based on the properties of the selected 3D image data.

In some embodiments, a 3D image editing system automatically adjusts the opacity of the selected image data and/or unselected image data. Specifically, the 3D image editing system increases the transparency of the unselected image data and sets the selected image data to be opaque (e.g., fully decreases the transparency of the selected image data) via respective alpha channel adjustments of the image data. In some other embodiments, the 3D image editing system generates a border around the selected image data and/or adds a halo to the selected image data about the border of a selection in order to differentiate the selection in a 3D space without changing the sizing, positioning, and/or visual characteristics of the selected image data. In still some other embodiments, the 3D image editing system hides or does not render the unselected image data. The 3D image editing system also inversely applies the different presentations of selected and unselected 3D image data (e.g., making the selected image data transparent and the unselected image data opaque, or hiding the selected image data and presenting the unselected image data). Each selection may also be expanded or modified via one or more selection adjustment tools.

The 3D image editing system analyzes the properties of the selected image data and/or uses one or more artificial intelligence and/or machine learning ("AI/ML") techniques to detect the object represented by the selected image data. The 3D image editing system modifies the user interface to dynamically present tools, functions, and/or effects that apply to the properties of the selected image data and/or are relevant or commonly used to edit the detected object. For instance, the 3D image editing system determines that the selected image data has a metallic material property, and dynamically enables a first set of tools for adjusting the chrominance and reflectivity of the selected image data while disabling a second set of tools for adjusting the transparency and elasticity of the selected image data in response to determining that the selected image data has the metallic material property.

The 3D image editing system is provided to assist and simplify user interactions with 3D images and 3D file formats including point clouds. Point clouds are especially difficult 3D formats to work with because a point cloud includes a disconnected set of points that are non-uniformly distributed in a 3D space. For instance, it is difficult to use keyboards, mice, trackpads, 3D controllers, and/or other input devices to accurately select a subset of points from the disconnected set of points across different planes, differentiate the selected points from unselected points separated by minute distances, and apply edits to the subset of points.

FIG. 1 illustrates an example point cloud 100 with non-uniformly distributed data points, 3D constructs, and/or 3D image data in accordance with some embodiments presented herein. The data points of point cloud 100 differ from pixels of a two-dimensional ("2D") image, because certain regions of point cloud 100 have no data points, lower densities of data points, and/or higher densities of data points based on varying amounts of visual information that is detected, scanned, or created at those regions. Additionally, the position of the point cloud data points are defined in 3D space using x, y, and z coordinate values. In contrast, pixels of a 2D image are defined in 2D space and have a uniform density or fixed arrangement that is defined by the resolution of the 2D image. In other words, the point cloud data points have a non-uniform placement or positioning, whereas the 2D image have pixel data for each pixel of a defined resolution (e.g., 640×480, 800×600, etc.).

Each point cloud data point is defined with a plurality of elements. The plurality of elements includes a first set of positional elements, and a second set of non-positional or descriptive elements. Values for the positional elements and/or non-positional elements of a particular point may be calculated from the return intensity of the light, laser, or signal reflecting off that particular point and returning to the scanning device.

The positional elements include coordinates within a 3D space. For instance, each point cloud data point includes x-coordinate, y-coordinate, and z-coordinate elements to capture the position of a corresponding physical point from a surface, feature, or object. The positional elements further include a surface normal. The surface normal defines the angle, direction, or orientation that the surface, feature, or object represented by the data point faces or is exposed to. More specifically, the surface normal is a line, ray, or vector that is perpendicular to the scanned surface, feature, or object represented by the data point. In some embodiments, the positional elements may be defined for created data points.

The non-positional elements include information about the detected characteristics of the surface, feature, or object at a corresponding position in the scanned scene. The characteristics may correspond to a detected color. The color may be represented using red, green, blue ("RGB"), and/or other values. In some embodiments, a data point may have multiple sets of non-positional elements with each set of non-positional elements storing intensity values or other hyperspectral values detected across a different band of the electromagnetic spectrum. For instance, a first set of non-positional elements may store values measured in the 800 to 2,500 nanometer wavelengths for near-infrared light, and a second set of non-positional elements may store values measured in the 10 to 400 nanometer wavelengths for ultraviolet light from the position of the real-world object identified by the associated positional elements of the data point.

In some embodiments, the non-positional elements store other measured or derived characteristics including the chrominance, hardness, translucence, reflectivity, luminance, metallic characteristics, roughness, specular, diffuse, albedo, index of refraction ("IOR"), and/or other properties from the imaged or created surface, feature, or object. In some embodiments, the non-positional elements directly identify a material property or other classification for a data point. For instance, a first data point may be defined with a non-positional element with a value that identifies the material property of "aluminum", a second data point may be defined with a non-positional element with a value that identifies the material property of "steel", and a third data point may be defined with a non-positional element with a value that identifies the material property of "plastic".

Each point cloud data point or 3D construct of the point cloud includes an array of elements. The array of elements may provide the positioning of the data point in 3D space as well as one or more characteristics of that data point. For instance, a point cloud data point may be stored and/or represented as an array of elements with some combination of x-coordinate, y-coordinate, z-coordinate, RGB values, values measured in the near-infrared band, values measured in the far-infrared band, values measured in the ultraviolet band, values measured in other hyperspectral bands, chrominance, hardness, translucence, reflectivity, luminance, metallic characteristics, roughness, specular, diffuse, albedo, IOR, tesla, and/or other values.

Figure 2:
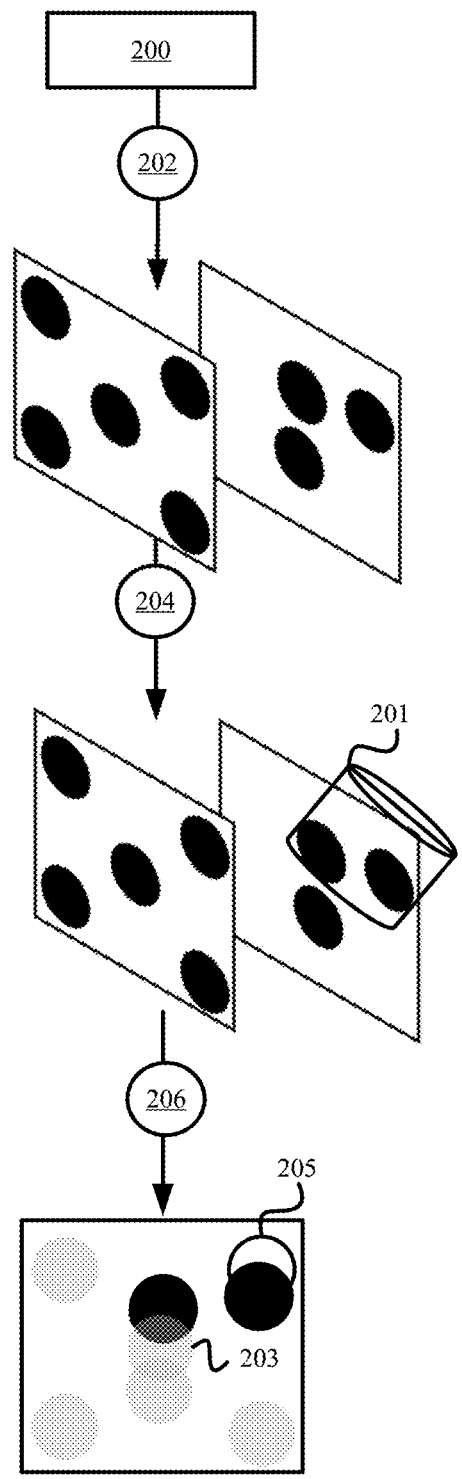
FIG. 2 illustrates an example of dynamically selecting a set of image data within a 3D file format in accordance with some embodiments presented herein.

FIG. 2 illustrates an example of presenting and differentiating a selected set of image data within a 3D file format in accordance with some embodiments presented herein. 3D image editing system 200 presents (at 202) data points of a point cloud in a 3D space (e.g., different x, y, and z planes), and receives (at 204) user input 201 for selecting a subset of the data points. For instance, the user interface may include a pointer tool, a marquee tool, a lasso tool, a magic wand tool, and/or other tools for selecting the subset of data points or the volume or region within the 3D space that includes the subset of data points.

3D image editing system dynamically adjusts (at 206) the transparency of the data points to differentiate the selected subset of data points from the unselected data points of the point cloud. Adjusting (at 206) the transparency includes increasing the transparency of the unselected data points so that the unselected data points do not obscure any of the selected subset of data points that may be behind the unselected data points in the view frustum, and so that the unselected data points are visually differentiable from the selected subset of data points without changing the sizing, positioning, and/or color values for the subset of selected data points. Adjusting (at 206) the transparency may also include setting the opacity of the selected subset of data points to 0% so that the selected subset of data points are opaque and presented without any adjustment to their visual characteristics (e.g., color values, brightness, contrast, etc.).

3D image editing system 200 increases the transparency of the unselected data points by adjusting the alpha channel property for the unselected data points. The alpha channel adjustment causes the unselected data points to become partially or fully transparent or see-through.

3D image editing system 200 presents the data points with the adjusted (at 206) transparency. The adjusted (at 206) transparency differentiates the selected subset of data points from the unselected data points while presenting the selected subset of data points in their original size and position with their original visual characteristics (e.g., unmodified color components).

In some embodiments, even with the transparency of the unselected data points increased, the unselected data points may still partially blend, blur, obscure, or interfere with the presentation of the selected subset of data points. Accordingly, in some such embodiments, 3D image editing system 200 discards the visual characteristics or color information of the unselected data points, and presents the unselected data points as fully transparent points, spheres, or constructs. A fully transparent point is presented as an outline of the point without any of the visual characteristics or color information inside the point. For instance, the transparency of unselected data point 203 is set to 50% so that unselected data point 203 is partially transparent, whereas the transparency of unselected data point 205 is set to 100% so that unselected data point 203 is fully transparent.

In some embodiments, no outline is provided for the fully transparent points. In some such embodiments, 3D image editing system 200 hides the unselected data points and presents only the selected subset of data points.

In some embodiments, the 3D image editing system 200 user interface provides a toggle or control with which the user may increase or decrease the transparency of the unselected data points. This provides the user with the option to view the selected subset of data points with or without the unselected data points and/or control the amount by which the unselected data points obscure the selected subset of data points. For instance, using the control, the user may select between removing the unselected data point entirely from view, presenting the unselected data points as fully transparent outlines, or presenting the unselected data points as constructs with visual characteristics that are partially transparent and that contribute to the visual characteristics of other data points behind the partially transparent unselected data point.

In some embodiments, 3D image editing system 200 performs a non-uniform transparency adjustment to the unselected set of image data or data points. In some such embodiments, the amount of the transparency adjustment may be dynamically determined based on the plane or z-depth position of the unselected data points. For instance, 3D image editing system 200 analyzes the depth or z-coordinate values associated with the selected and unselected data points, determines the transparency adjustments for the unselected data points based on whether the unselected data points are positioned in front or behind the selected data points.

A first unselected data point in a near plane that is front of the selected set of data points is likely to create the most obstructed viewing of the selected data points. Accordingly, 3D image editing system 200 increases the opacity of the first unselected data point by a first amount to make the first unselected data point fully or almost fully transparent. A second unselected data point in the same depths or planes as the selected set of data points is unlikely to obscure the selected set of data points but may make it difficult to differentiate where the selection begins and ends. Accordingly, 3D image editing system 200 increases the opacity of the second unselected data point by a second amount that is less than the first amount to differentiate the second unselected data point from the selected set of data points on the same or similar planes. A third unselected data point that is positioned behind the selected set of data points cannot obscure the selected set of data points but may again make it difficult to differentiate where the selection begins and ends. Accordingly, 3D image editing system 200 does not change the opacity or minimally adjusts the opacity of the third unselected data point by a third amount that is less than the second amount to differentiate the third unselected data point from the selected set of data points in the closer planes.

3D image editing system 200 may provide different controls to adjust the opacity or transparency of the unselected data points in the different planes. For instance, a user may wish to hide all unselected data points in the z-coordinate planes that are in front of and/or in the same planes as the selected set of data points, and may want to show the unselected data points without any adjustment that are in the z-coordinate planes behind the planes of the selected set of data points. In this instance, the user may adjust the controls to vary the presentation of the unselected data points in the planes having smaller, equal, or larger z-coordinate values than the z-coordinate values of the selected set of data points.

3D image editing system 200 may adjust the tint or coloring of the unselected data points to further differentiate the unselected data points from the selected data points. For instance, 3D image editing system 200 may provide one or more controls for adjusting the tint or coloring of the unselected set of data points that are in the same plane as the selected set of data points so that the unselected set of data points have a reddish or greenish tint that differentiates the unselected set of data points from the selected set of data points in the same plane.

The differentiation provided based on the transparency, tint, and/or color adjustments assist the user in identifying whether the selection includes and excludes the desired data points. The user may interact with the selection tool to then modify the selection.

The presentation of the selected and unselected image data with different transparencies is provided by 3D image editing system 200 because the issues of unselected image data in a closer plane obscuring selected image data in a farther plane is not an issue that affects the presentation of 2D image data selections. Other techniques involving the resizing, repositioning, or recoloring of the selected 3D image data distort the 3D image such that the effects of subsequently applied edits are not accurately represented by the selected 3D image data that is selected and resized, repositioned, or recolored. However, by adjusting the transparency of the unselected 3D image data or hiding the unselected 3D image data so that the selected 3D image data can be seen without obstruction with their original sizes, positions, and colors, the effects of any subsequently applied edits on the selected 3D image data are accurately conveyed and can be viewed without distortion relative to all other 3D image data.

Figure 3:
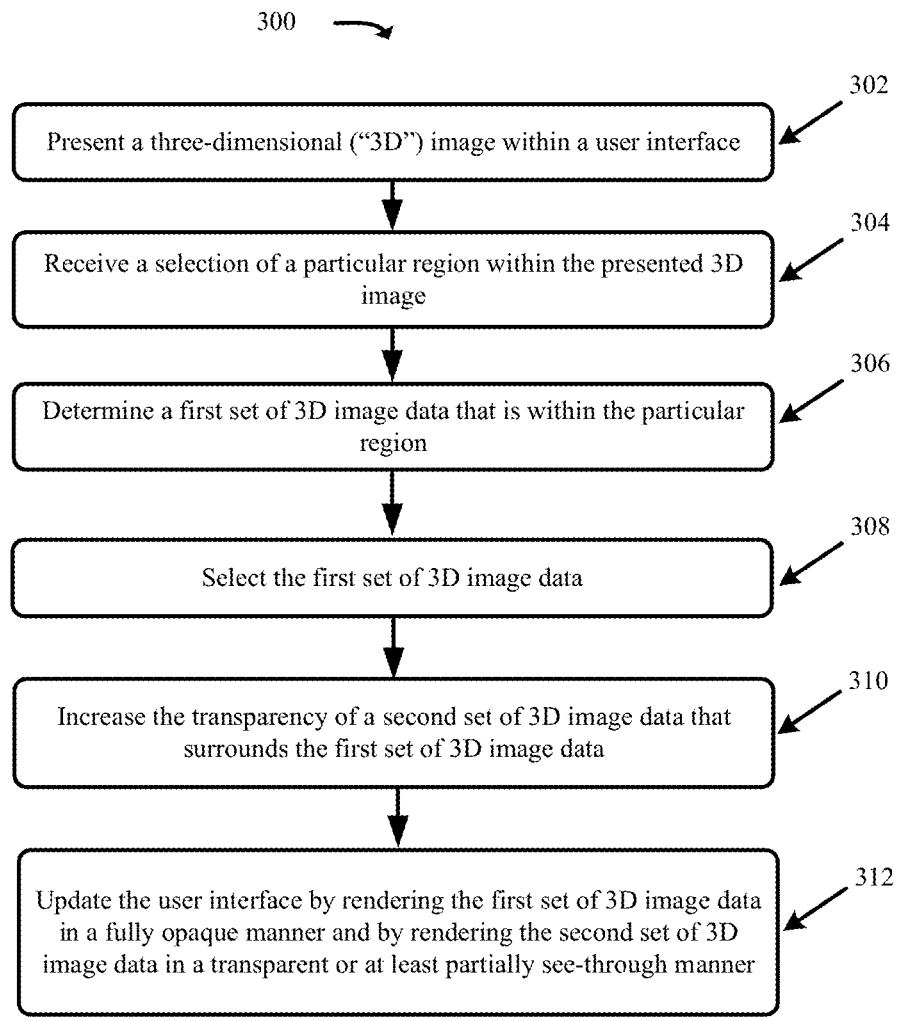
FIG. 3 presents a process for presenting a 3D selection of data points using transparency adjustments in accordance with some embodiments presented herein.

FIG. 3 presents a process 300 for presenting a 3D selection of data points using transparency adjustments in accordance with some embodiments presented herein. Process 300 is implemented by 3D image editing system 200. 3D image editing system 200 includes one or more devices or machines with processing, memory, storage, network, and/or other hardware resources for processing, editing, and/or otherwise interacting with 3D images and file formats such as point clouds.

Process 300 includes presenting (at 302) a 3D image within a user interface. For instance, 3D image editing system 200 receives a point cloud, and renders the point cloud data points that fall within a view frustum to generate the 3D image within the user interface.

Process 300 includes receiving (at 304) a selection of a particular region within the presented (at 302) 3D image. The user interface provides one or more selection tools with which users select the particular region. For instance, the selection tools may provide cubes, cylinders, pyramids, and other volumetric shapes for selecting a volume or region within the 3D space of the 3D image. In some embodiments, the selection tools include a pointer that moves within the 3D space and that is used to select the particular region by defining a border or boundary around the particular region. In some other embodiments, the user interface provides input fields for defining selection criteria or the particular region that is to be selected. For instance, the coordinates for the boundaries or edges of the particular region may be defined in the input fields. Alternatively, users may specify values for a set of positional and/or non-positional elements, and 3D image editing system 200 may automatically define the particular region to include point cloud data points that have the specified values for the set of positional and/or non-positional elements.

Process 300 includes determining (at 306) a first set of 3D image data that is within the particular region. 3D image editing system 200 compares the positional elements or coordinates spanned by the particular region against the positional elements defined for the image data that is presented (at 302) in the 3D image, and determines (at 306) the first set of 3D image data that is within the particular region. For instance, the particular region may be defined as a volume that includes empty space (e.g., point cloud positions at which no data points are defined) and that spans the positions of the first set of 3D image data. Accordingly, 3D image editing system 200 determines (at 306) which data points are within the particular region and should be selected, and which data points are outside the particular region and should remain unselected.

Process 300 includes selecting (at 308) the first set of 3D image data. Specifically, 3D image editing system 200 selects (at 308) the data points of the 3D image that are positioned in the particular region. Selecting (at 308) the first set of 3D image data includes applying any subsequently invoked tools, functions, or effects on the selected (at 308) first set of 3D image data rather than all data points or image data of the 3D image.

Process 300 includes increasing (at 310) the transparency of a second set of 3D image data that is not selected and that surrounds the first set of 3D image data. In some embodiments, 3D image editing system 200 increases (at 310) the transparency for all data points of the 3D image that are not selected or are not within the particular region.

Increasing (at 310) the transparency includes adjusting the alpha channel for the second set of 3D image data so that the second set of 3D image data does not fully obscure the viewing of the first set of 3D image data when the second set of 3D image data is located in a closer plane and/or in front of the first set of 3D image data in the view frustum. In some embodiments, 3D image editing system 200 adjusts the alpha channel so that the second set of 3D image data is rendered with their visual characteristics in a semi-transparent or see-through manner (e.g., 50% transparency). In some embodiments, 3D image editing system 200 adjusts the alpha channel so that the second set of 3D image data is rendered in a fully transparent or see-through manner (e.g., 100% transparency) in which the outline or form of the second set of 3D image data is rendered without any visual characteristics within the outline or form. In some embodiments, 3D image editing system 200 hides or does not render the second set of 3D image data.

3D image editing system 200 may dynamically increase (at 310) the transparency of the second set of 3D image data relative to their depth or distance from the selected first set of 3D image data. 3D image editing system 200 may compare the z-coordinate position or depth of the second set of 3D image data against the z-coordinate position or depth of the first set of 3D image data, provide a greater increase to the transparency of data points from the second set of data points that are in front of the first set of data points, in a plane that is closer to the virtual camera position than the first set of data points, or in the near plane of the view frustum, and a lesser increase to the transparency of the data points from the second set of data points that are behind the first set of data points, in a plane that is further from the virtual camera position than the first set of data points, or in the far plane of the view frustum. Moreover, 3D image editing system 200 may provide interactive controls with which the user may adjust the transparency of the second set of 3D image in all planes or in different planes.

Process 300 includes updating (at 312) the user interface by rendering the first set of 3D image data in a fully opaque manner such that the visualizations produced from rendering the first set of 3D image data are not transparent or see-through, and rendering the second set of 3D image data in a transparent or at least partially see-through manner such that the visualizations produced from rendering the second set of 3D image data do not obscure the viewing of the visualization produced from rendering the first set of 3D image data. The resulting opaque and transparent visualizations allow the user to see and differentiate the first set of 3D image data that has been selected (at 308) from the second set of 3D image data that is unselected without changing the sizing, positioning, or visual characteristics of the first set of 3D image data.

In some embodiments, the user interface includes interactive controls for changing or supplementing the manner with which selected and unselected image data are differentiated and/or visualized. For instance, 3D image editing system 200 may identify the selected set of data points by generating a visual border around the selected set of data points.

Figure 4:
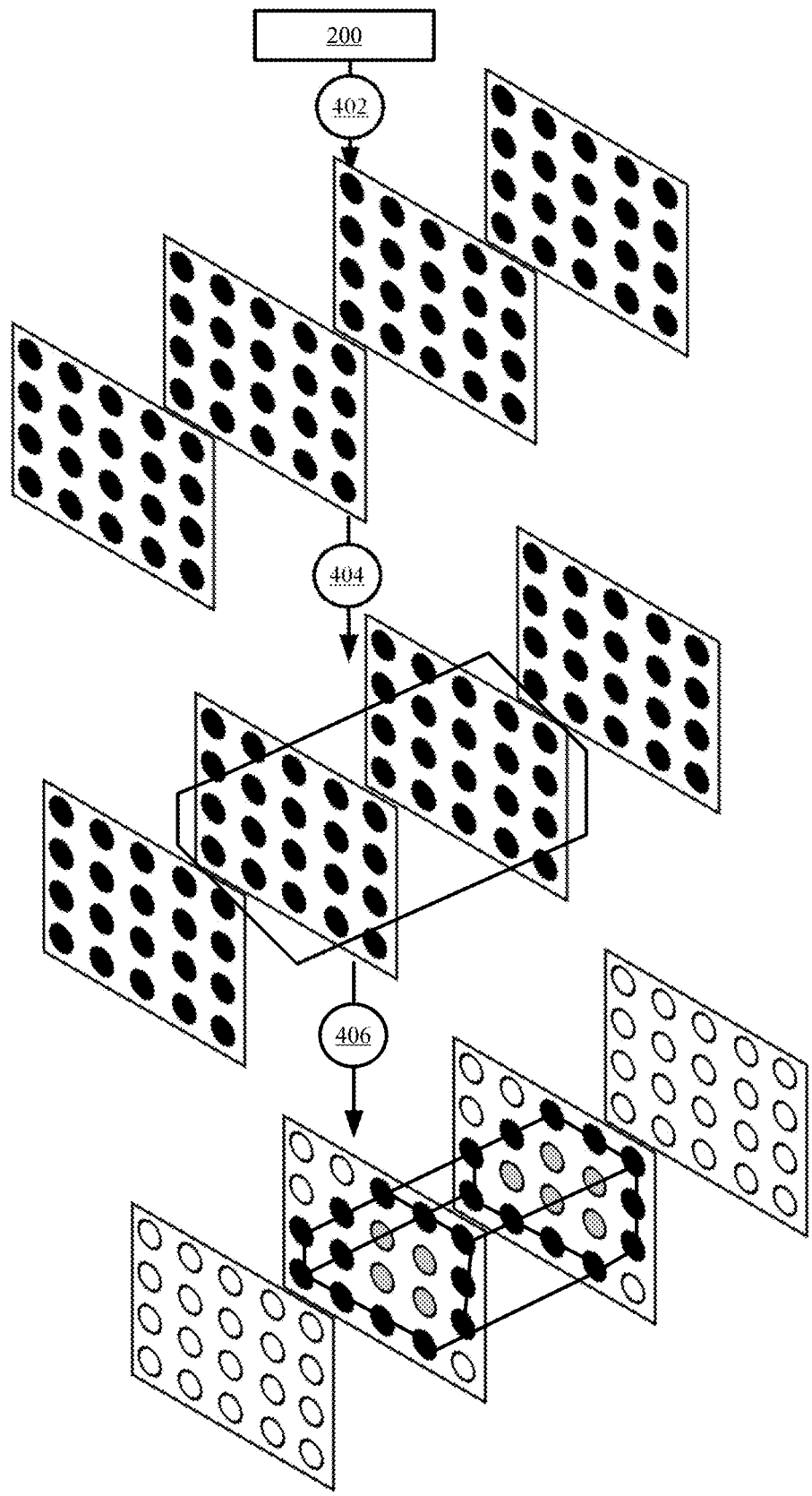
FIG. 4 illustrates an example of identifying a selection of 3D image data with a 3D border in accordance with some embodiments presented herein.

FIG. 4 illustrates an example of identifying a selection of 3D image data with a 3D border in accordance with some embodiments presented herein. 3D image editing system 200 presents (at 402) data points of a point cloud in a 3D space, and receives (at 404) user input for selecting a subset of the data points. In particular, the user input may include drawing a volume or other 3D shape to identify the selected region with the 3D space.

The selected region does not directly identify the data points within that region that are selected and further includes empty space. Accordingly, 3D image editing system 200 refines the selection to directly identify the set of data points within the selected region that have been selected. Refining the selection includes determining the set of data points that are within the selected region, and determining the subset of data points that are at the outer edges or boundary of the set of data points. The subset of data points include the data points form the set of data points that have at least one side that is not obscured by another point in the set of data points or that have at least one side that is exposed to an unselected data point. In other words, 3D image editing system 200 defines the subset of points to include the data points that form the front, top, back, bottom, side, and/or outer faces of the selected set of data points.

3D image editing system 200 defines (at 406) a visual border around the subset of data points. Defining the visual border may include generating a line that connects or intersects the face, boundary, or border created by different combinations of the subset of data points. For instance, 3D image editing system 200 defines (at 406) a first visual border that connects or links the data points from the subset of data points that form the border, boundary, or edges for the top face of the selection, a second visual border that connects or links the data points from the subset of data points that form the border, boundary, or edges for the bottom face of the selection, and additional visual borders that connect or link the data points from the subset of data points that form the borders, boundaries, or edges for the front, back, and sides faces of the selection.

In FIG. 4, the data points represented with the black color correspond to the subset of data points that are connected with the one or more defined (at 406) visual borders, the data points represented with the gray color correspond to the other data points from the set of data points that are selected but that are not at the outer edges or boundary of the selection or set of data points, and the data points represented with the white color correspond to the unselected data points. In some embodiments, 3D image editing system 200 presents all data points from the set of data points as opaque and non-transparent points without changing the size, positioning, or visual characteristics of the set of data points with the visual border differentiating the selected data points from the unselected data points and the boundary of the selection. In some such embodiments, 3D image editing system 200 increases the transparency of the unselected data points so that the selected set of data points and the boundary of the selection is not obscured by the presented of the unselected data points.

In some embodiments, 3D image editing system 200 defines (at 406) the visual border when the spacing between the subset of data points is greater than a threshold distance. For instance, when the subset of data points are densely positioned next to one another with little or no gaps between neighboring data points, the visual border may itself be obscured due to the closeness of the data points at the selection border. However, when the subset of data points are sparsely positioned next to one another with noticeable gaps in between neighboring points, 3D image editing system 200 defines (at 406) the visual border to present the outline for the selection border that spans the gaps between the data points making up the selection border.

Figure 5:
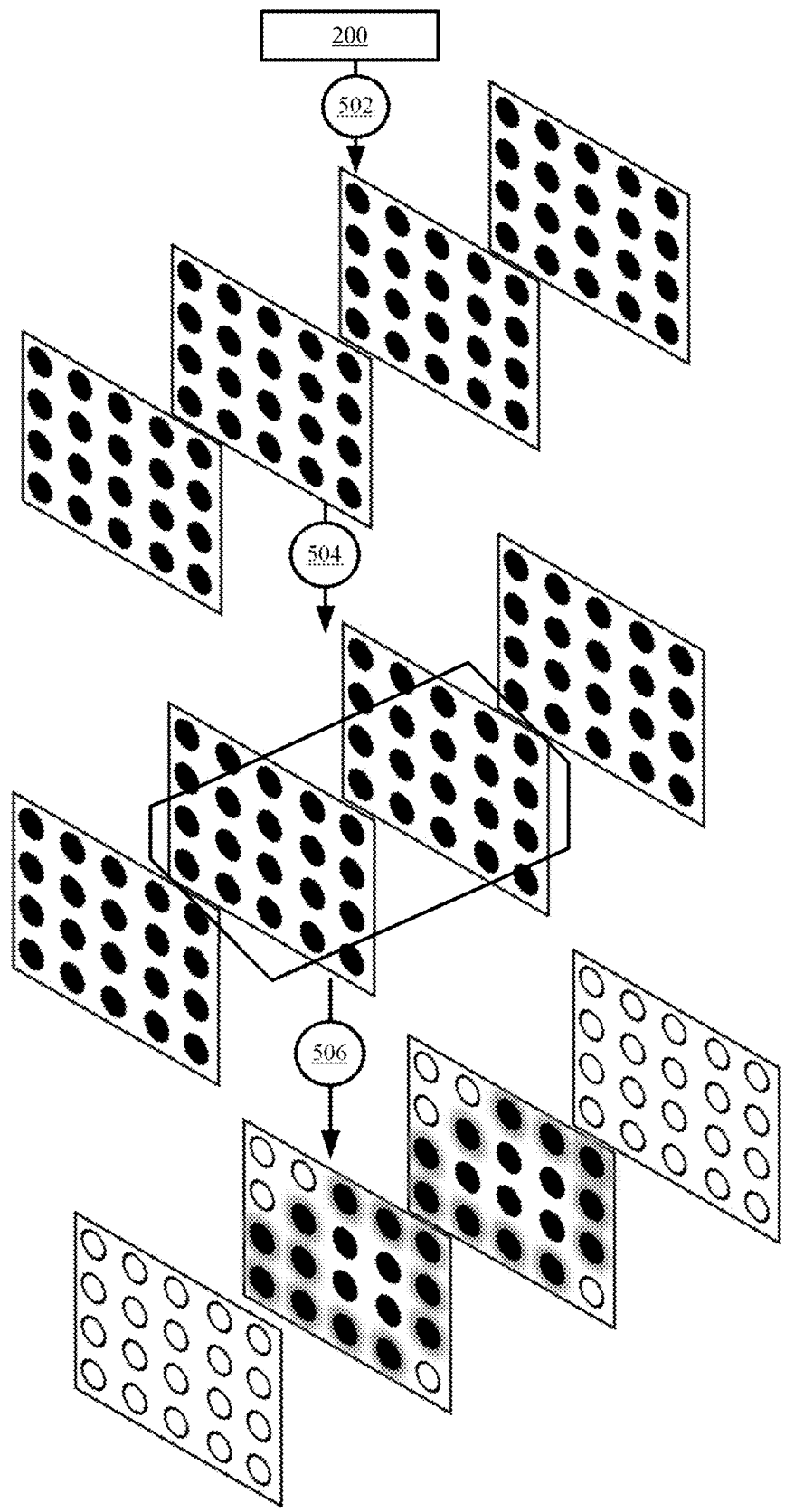
FIG. 5 illustrates an example of differentiating the edge or boundary of a selected set of data points with the halo effect in accordance with some embodiments presented herein.

In some embodiments, 3D image editing system 200 removes the visual border or the line connecting the subset of data points at the border of the selected 3D region, and provides a halo or other visual reference to differentiate the subset of data points at the border of the selected 3D region. FIG. 5 illustrates an example of differentiating the edge or boundary of a selected set of data points with the halo effect in accordance with some embodiments presented herein.

3D image editing system 200 presents (at 502) a 3D image, and receives (at 504) a user selection of a 3D region within the 3D image. 3D image editing system 200 determines the set of data points that are within the 3D region, selects the set of data points, determines a subset of data points that are at the border or edges of the set of data points, and presents (at 506) the subset of data points with a halo effect.

The halo effect does not modify the sizing, positioning, or visual characteristics. The halo effect aids in differentiating the border of the selected set of data points from surrounding unselected data points by presenting a glow, shadow, or other visual cue around each data point of the subset of data points. In some embodiments, generating the halo effect or visual cue for a particular data point includes extending the visual characteristics of the particular data point around the periphery of the particular data point with a decreasing gradient that causes the visual characteristics to gradually taper off or disappear upon reaching a certain distance from the center or position of the particular data point.

Figure 6:
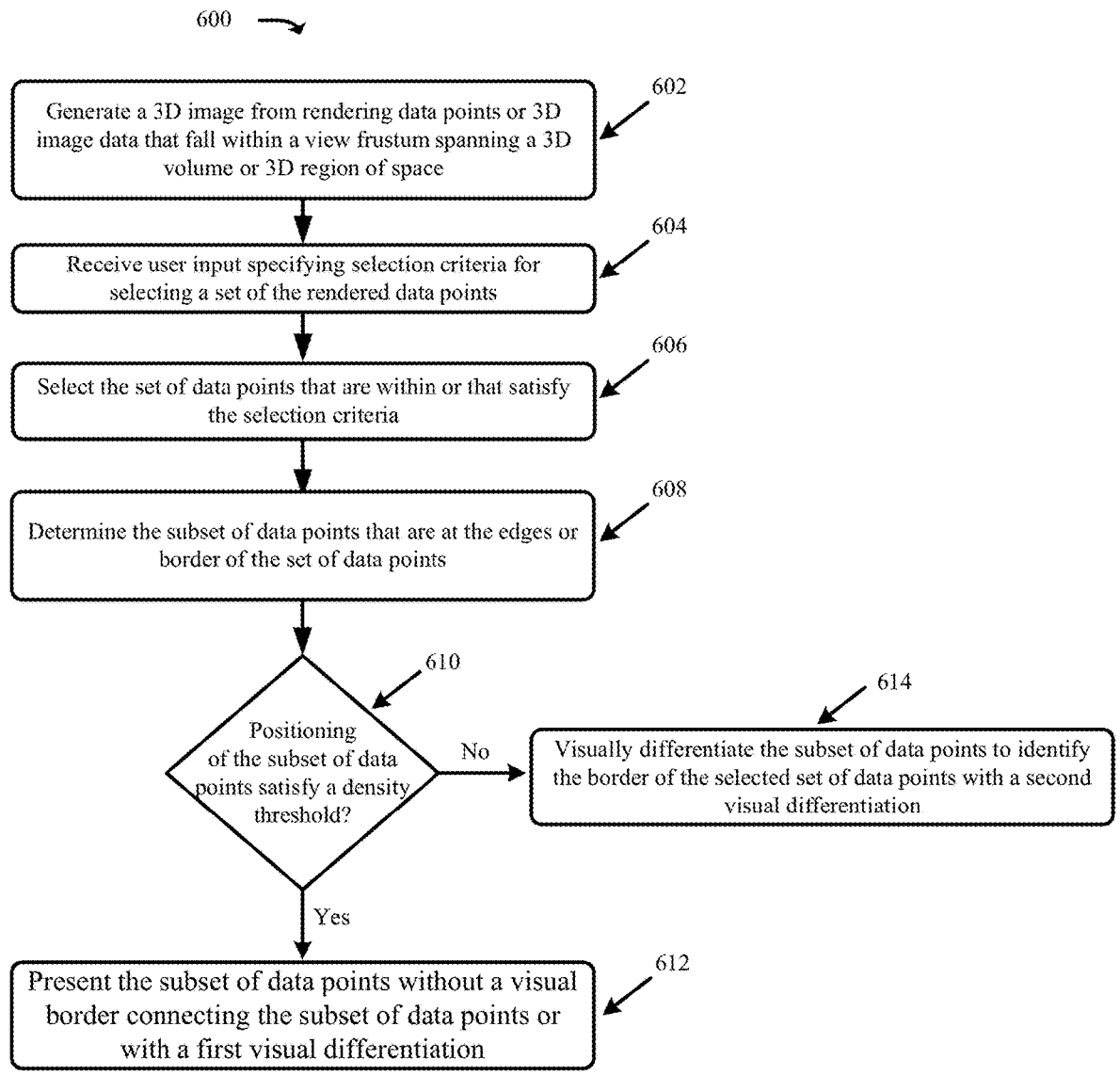
FIG. 6 presents a process for differentiating a boundary of a selected set of 3D image data from surrounding unselected 3D image data in accordance with some embodiments presented herein.

FIG. 6 presents a process 600 for differentiating a boundary of a selected set of 3D image data from surrounding unselected 3D image data in accordance with some embodiments presented herein. Process 600 is implemented by 3D image editing system 200.

Process 600 includes generating (at 602) a 3D image from rendering data points or 3D image data that fall within a view frustum spanning a 3D volume or 3D region of space. Specifically, 3D image editing system 200 renders each data point at a position in the 3D volume or 3D region of space defined by the positional element values of that data point with visual characteristics defined by the non-positional element values of that data point. The 3D image is presented as part of a user interface created by 3D image editing system 200 or a 3D image viewing, processing, and/or editing application that runs in conjunction with 3D image editing system 200.

Process 600 includes receiving (at 604) user input specifying selection criteria for selecting a set of the rendered data points. In some embodiments, the selection criteria is defined with a selection tool that the user uses to select a subvolume or subregion of the 3D image that encompasses a set of all rendered data points. In some embodiments, the selection criteria is defined based on coordinates or desired values for positional or non-positional elements of the selected set of data points.

Process 600 includes selecting (at 606) the set of data points that are within or that satisfy the selection criteria. Selecting (at 606) the set of data points includes obtaining the set of data points for manipulation or adjustment by a subsequently invoked function, effect, or other edit.

Process 600 includes determining (at 608) the subset of data points that are at the edges or border of the set of data points, or that are positioned at the exterior faces of the selection. 3D image editing system 200 compares the positional elements of the set of data points, and determines (at 608) the subset of data points as the data points within the set of data points that are exposed to or in between a selected data point from the set of data points and an unselected data point that is not part of the set of data points.

Process 600 includes determining (at 610) whether the positioning of the subset of data points satisfies a density threshold. In some embodiments, 3D image editing system 200 computes the distance separating two neighboring data points of the subset of data points, and compares the distance against the density threshold to determine (at 610) if their positioning satisfies the density threshold. The density threshold specifies an amount of separation between neighboring data points of the subset of data points that produces noticeable gaps or creates discontinuity about the edge or border of the selection.

In response to determining (at 610—Yes) that the positioning of the subset of data points satisfies the density threshold, process 600 includes presenting (at 612) the subset of data points without a visual border connecting the subset of data points or with a first visual differentiation. The first visual differentiation may include providing the halo effect or visual cue to each data point of the subset of data points without affecting the positioning, sizing, or visual characteristics of the subset of data points or other data points from the selected set of data points. In other words, the halo does not affect the position, size, and visual characteristics with which each data point of the subset of data points is rendered, and enhances the rendering by differentiating the rendered subset of data points from other data points of the set of data points.

In response to determining (at 610—No) that the positioning of the subset of data points does not satisfy the density threshold, process 600 includes visually differentiating (at 614) the subset of data points with a second visual differentiation that identifies the border of the selected set of data points. Visually differentiating (at 614) the subset of data points includes adding a line, marker, or other connector to link the subset of data points and visually identify the border around the selected set of points.

Different tools, functions, and/or effects may be applied to the selected set of data points. The tools, functions, and/or effects adjust the values for one or more positional elements or non-positional elements of the selected set of data points. For instance, 3D image editing system 200 provides interactive tools for moving, rotating, transforming, scaling, and changing visual characteristics (e.g., color, contrast, brightness, highlights, reflectivity, saturation, etc.) of the selected set of data points. Other tools or functions may be used to define parent-child relationships, animate, filter, present displayable modes, change opacity, apply forces or physics, decimate, pivot, and/or perform other manipulations of the selected set of data points. The user interface of 3D image editing system 200 may further present information for tracking the edits that have been applied, the data point values, and/or other data related to the editing of the data points.

Figure 7:
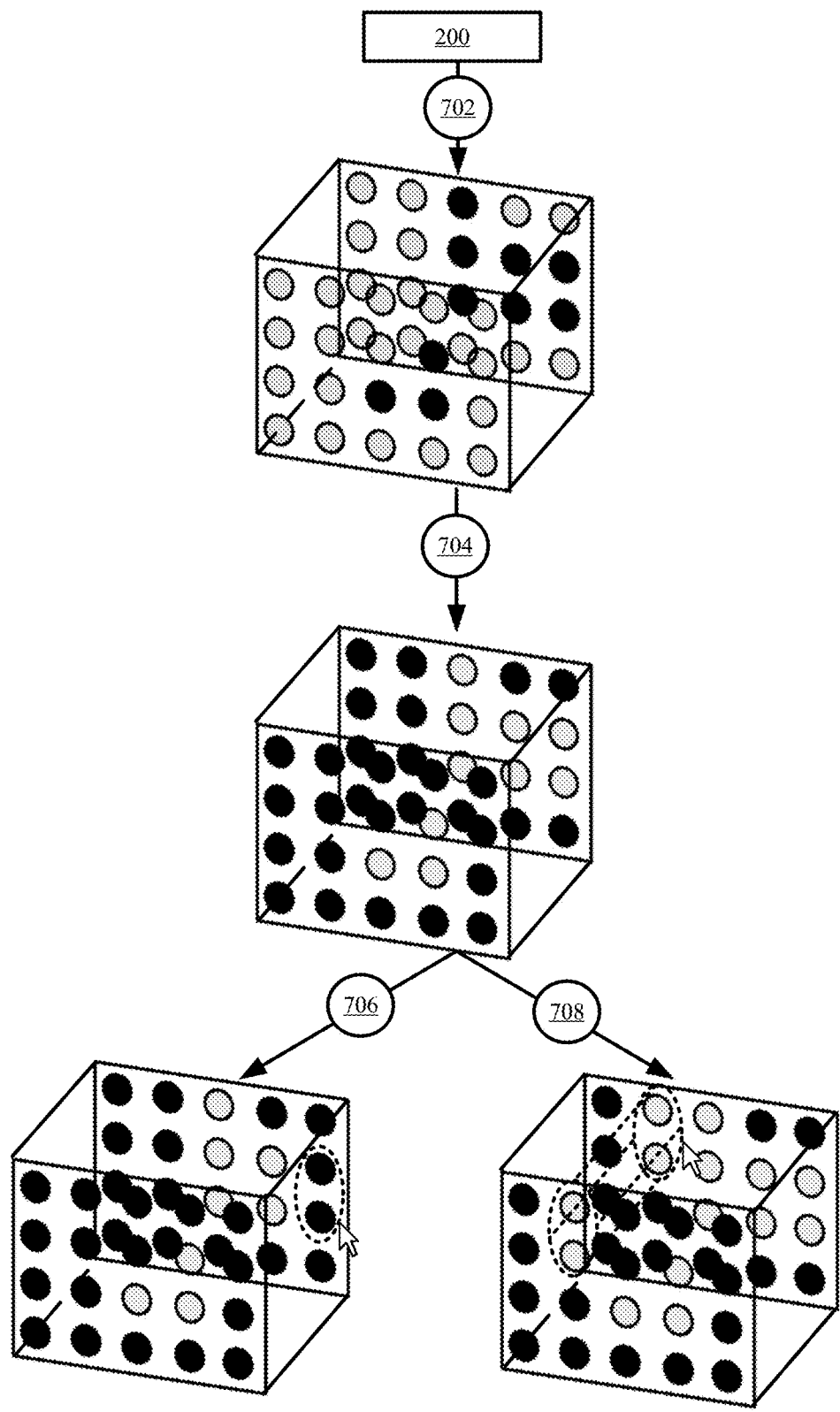
FIG. 7 illustrates an example of modifying the selection of 3D image data in accordance with some embodiments presented herein

The tools, functions, and/or effects may also be used to change or expand a selection. FIG. 7 illustrates an example of modifying the selection of 3D image data in accordance with some embodiments presented herein.

3D image editing system 200 selects a first set of data points in response to user input. 3D image editing system 200 presents (at 702) the selection by differentiating the first set of data points from the unselected second set of data points via the transparency adjustment of the unselected data points, outlining of the selection border, or halo effect.

3D image editing system 200 inverts (at 704) the selection in response to user input. Inverting (at 704) the selection includes reversing the selection so that the first set of data points become selected and the second set of data points are selected, and reversing the visual differentiation of the first and second sets of data points. For instance, as shown FIG. !7, the previously selected first set of data points become partially transparent and the previously unselected second set of data points become fully opaque.

3D editing system 200 provides additional tools for adjusting the selection. For instance, 3D editing system 200 expands (at 706) the selection in response to unselected points that a user selects with a pointer tool or other selection tool, and removes (at 708) data points from the selection in response to deselecting selected data points with a pointer tool or other deselection tool.

In some embodiments, 3D image editing system 200 has hundreds of tools, functions, and effects that may be applied to different data points and may present additional data about the data points in one user interface. However, rather than present all such tools, functions, effects, and data at all times or for every different selection of data points, 3D image editing system 200 uses one or more AI/ML techniques to filter the available tools, functions, effects, and data in order to present those that are most frequently used, applicable to, and/or relevant to the data points that have been selected based on the positioning, visual characteristics, and/or values defined for other non-positional elements of the selected data points.

Figure 8:
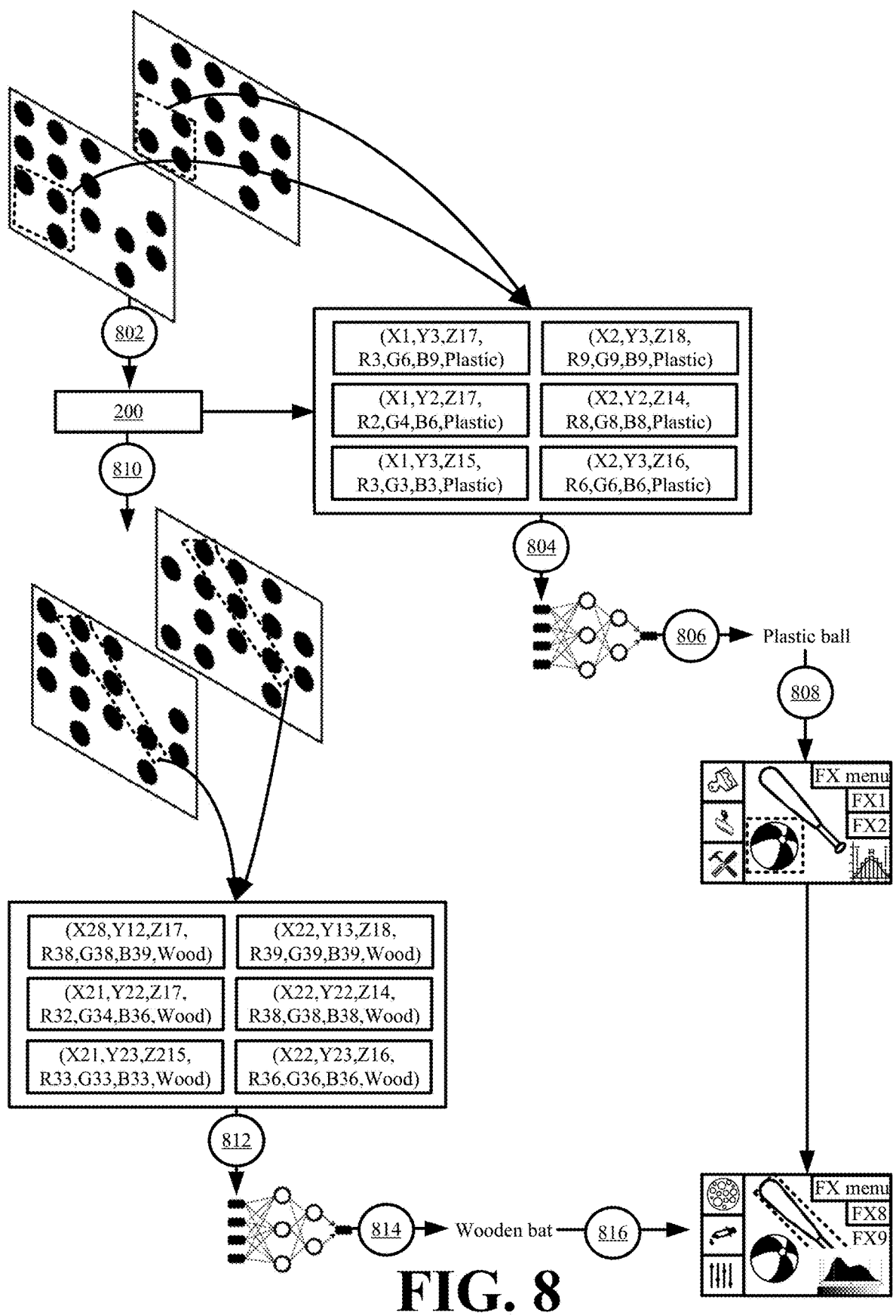
FIG. 8 illustrates an example of dynamically customizing the toolset for editing a 3D image based on the data points that are selected within the 3D image.

FIG. 8 illustrates an example of dynamically customizing the user interface for editing a 3D image based on the data points that are selected within the 3D image. As shown in FIG. 8, a user selects (at 802) a first set of data points of the 3D image using a selection tool or by specifying first selection criteria.

3D image editing system 200 analyzes (at 804) the positional and non-positional elements of the first set of data points. In some embodiments, 3D image editing system 200 performs the analysis (at 804) by providing the values defined for the positional and non-positional elements of the first set of data points as inputs to different neural network models created for different objects or material properties.

In some embodiments, the material property is defined as a non-positional element of the data points. For instance, the first set of data points may each include a non-positional element that is defined with one of the material property values for glass, metal, wood, ceramic, or plastic. In some such embodiments, the material property analysis involves comparing the material property non-positional element for each data point of the first set of data points, and determining if a threshold number of the first set of data points are defined with the same value for the material property non-positional element.

3D image editing system 200 classifies (at 806) the first set of data points as a first object or material property based on the analysis (at 804), and enables (at 808) a first set of tools, functions, effects, and/or supplemental data in the user interface that are linked to the editing of the first object or material property. Enabling (at 808) the first set of tools, functions, effects, and/or supplemental data includes presenting interactive user interface elements for selecting, invoking, applying, configuring, or otherwise using each of the first set of tools, functions, and/or effects on the first set of data points and for presenting a first set of supplemental data while hiding, disabling, or deprioritizing accessing to other tools, functions, effects, and/or supplemental data.

3D image editing system 200 detects (at 810) that the selection changes from the first set of data points to a second set of data points of the 3D image in response to invocation of the selection tool or second selection criteria being defined by the user. 3D image editing system 200 analyzes (at 812) the positional and non-positional elements of the second set of data points against the neural network models, and classifies (at 814) the second set of data points as a second object or material property based on the analysis (at 812). In response to classifying (at 814) the second set of data points as a second object or material property, 3D image editing system 200 disables the first set of tools, functions, effects, and/or supplemental data that were enabled (at 808) when the first set of data points representing the first object or material property were selected, and enables (at 816) a second set of tools, functions, effects, and/or supplemental data that are linked to the editing of the second object or material property.

Figure 9:
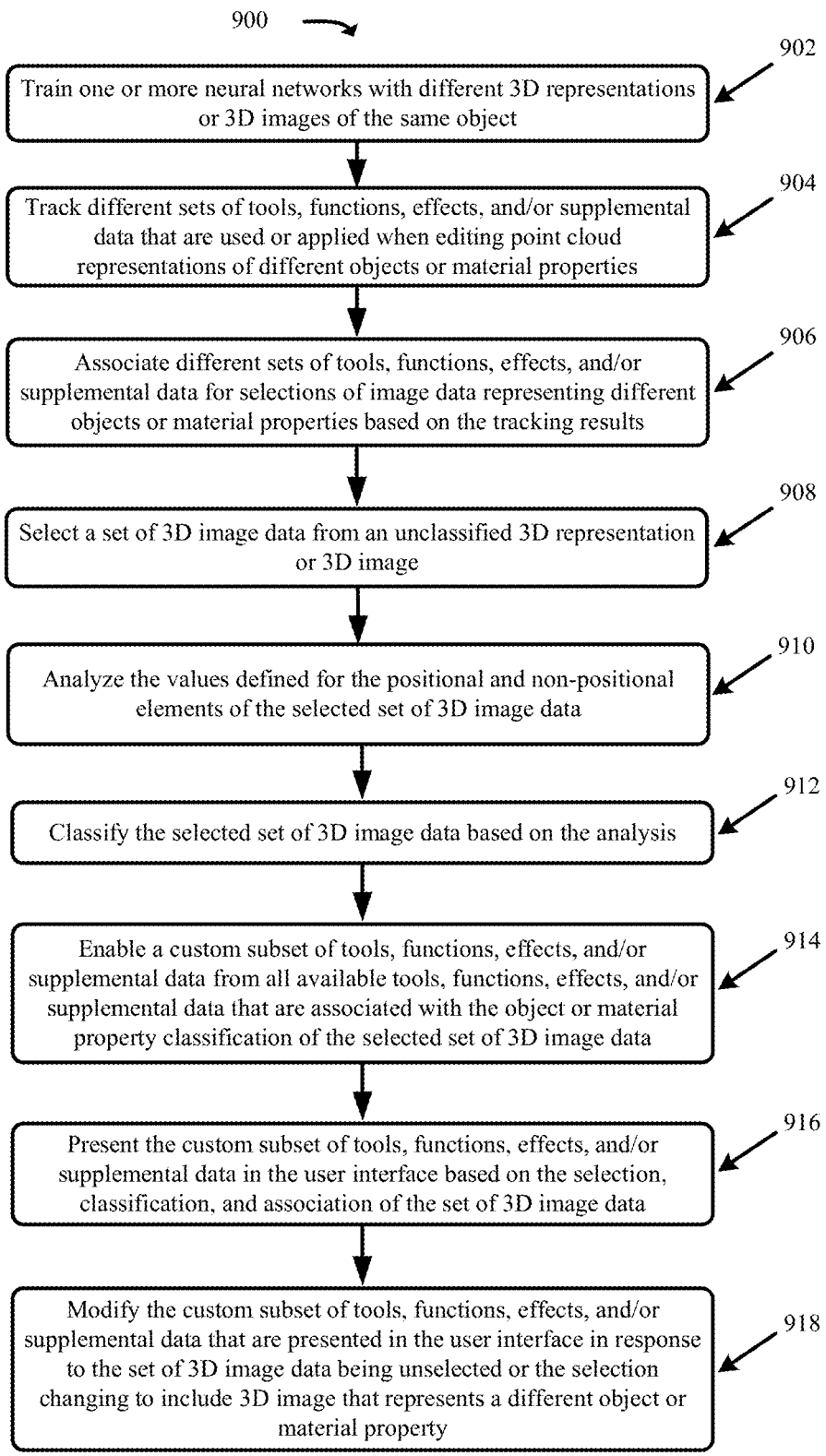
FIG. 9 presents a process for dynamically customizing the editing of different selections of 3D image data in accordance with some embodiments presented herein.

FIG. 9 presents a process 900 for dynamically customizing the editing of different selections of 3D image data in accordance with some embodiments presented herein. Process 900 is implemented by 3D image editing system 200.

Process 900 includes training (at 902) one or more neural networks with different 3D representations or 3D images of the same object. For instance, 3D image editing system 200 inputs different point cloud representations for different objects into the one or more neural networks. In some embodiments, the point clouds provided as training data are labeled to identify the objects they represent. The neural networks compare different combinations of positional and/or non-positional elements from different combinations of the point cloud data points that represent the same object in order to identify commonality or repeating combinations that uniquely identify and differentiate one object from other objects by a threshold percentage. For instance, the neural networks create a connected set of synapses for a particular structural arrangement (e.g., positioning of data points) and for a particular set of visual characteristics (e.g., RGB values that are in a particular range, have a specific range of reflectivity, etc.) that are determined to be present in at least 80% of point clouds representing a particular object and that are determined to be absent from at least 75% of point cloud representing other objects. Once a connected set of synapses is determined to identify the particular object or differentiate the particular object from other objects with a threshold certainty, the connected set of synapses is retained or added to the neural network model that is used to detect the particular object in other unlabeled or unclassified point clouds.

Process 900 includes tracking (at 904) different sets of tools, functions, effects, and/or supplemental data that are used or applied when editing point cloud representations of different objects or material properties. Tracking (at 904) the different sets of tools, functions, effects, and/or supplemental data includes determining the which of the tools, functions, effects, and supplemental data are most frequently used, relevant to, and/or interactive with when data points representing different objects or material properties are selected. For example, 3D image editing system 200 determines that a first set of tools, functions, effects, and/or supplemental data are most frequently used to edit point cloud representations of a first object, and that a second set of tools, functions, effects, and/or supplemental data are most frequently used to edit point cloud representations of a second object. As another example, 3D image editing system 200 determines that a reflectivity, transparency, and highlight adjustment (e.g., a first set of tools, functions, or effects) are applied to point cloud representations of a glass material property (e.g., a first material property), and that a physics, force, and animation adjustments (e.g., a second set of tools, functions, or effects) are applied to point cloud representation of an elastic material property (e.g., a second material property). The tracking may be based on user selections or invocations of the tools, functions, or effects and user interactions with the displays, histograms, distributions, event history, and/or other supplemental data that is presented in the user interface. 3D image editing system 200 may use one or more AI/ML techniques to detect usage patterns and/or establish relationships between different editing tools, functions, effects, and/or supplemental data and the object or material property classification for the image data that those editing tools, functions, and/or effects are invoked against.

Process 900 includes associating (at 906) different sets of tools, functions, effects, and/or supplemental data for selections of image data representing different objects or material properties based on the tracking results. 3D image editing system 200 may generate a definition or linked list for each available tool, function, effect, and/or supplemental data that is associated with one or more object or material property classifications. In some embodiments, the association (at 906) of tools, functions, effects, and supplemental data to different objects or material properties is manually defined or adjusted. For instance, an administrator configures a cut, copy, and paste tool to be available for all objects or material properties, a reflectivity adjustment tool to be available for objects or data points with reflective material properties, and a texture adjustment tool to be available for objects or data points with coarse material properties.

Process 900 includes selecting (at 908) a set of 3D image data from an unclassified 3D representation or 3D image. The unclassified 3D representation or 3D image is not labeled with an identifier that identifies or classifies the one or more objects represented by the selected set of 3D image data or other image data in the 3D image. The selection (at 908) may include a set of data points from a point cloud that represent part or all of one or more objects within the larger point cloud.

Process 900 includes analyzing (at 910) the values defined for the positional and non-positional elements of the selected set of 3D image data. Analyzing (at 910) the selected set of 3D image data includes inputting the values that are defined for the positional and non-positional elements of the selected set of 3D image data into the trained (at 902) neural network models, and determining if the input values match to the structures (e.g., data point arrangement or position) or visual characteristics of a modeled object within the neural network models. For instance, if the values defined for the positional elements and the non-positional elements of the selected set of 3D image data are in range of the values defined for a particular set of synapses in a neural network model for the identification of a particular object, then the neural network model may output a vector that classifies the selected set of 3D image data as representing the particular object by a certain probability. Analyzing (at 910) the selected set of 3D image data also includes comparing the values defined for the positional and/or non-positional elements of the selected set of 3D image data to determine if a threshold number of the 3D image data (e.g., point cloud data points) are defined with the same material property value. For instance, the analysis (at 910) involves determining if at least 70% of the image data within the selected set of 3D image data are defined with the same value for the same material property non-positional element.

Process 900 includes classifying (at 912) the selected set of 3D image data based on the analysis (at 910). Classifying (at 912) the selected set of 3D includes specifying the object or material property that is represented by the selected set of 3D data. In some embodiments, 3D image editing system 200 associates an object or material property label to the selected set of 3D image data.

Process 900 includes enabling (at 914) a custom subset of tools, functions, effects, and/or supplemental data from all available tools, functions, effects, and/or supplemental data that were associated (at 906) with the object or material property classification (at 912) of the selected set of 3D image data. Enabling (at 914) the custom subset of tools, functions, effects, and/or supplemental data includes modifying the dropdown menus, icons, toolboxes, and/or other visual or interactive elements of the user interface to include or prioritize access to the subset of tools, functions, effects, and/or supplemental data and to hide, disable, or deprioritize access to other tools, functions, effects, and/or supplemental data that are not associated with the object or material property represented by the selected set of 3D image data.

Process 900 includes presenting (at 916) the custom subset of tools, functions, effects, and/or supplemental data in the user interface based on the selection, classification, and association of the set of 3D image data. Other tools, functions, effects, and/or supplemental data that are not associated with the object or material property represented by the selected set of 3D image data and that were not enabled as a result may still be accessible albeit from a nested structure that requires more navigational steps than accessing the custom subset of tools, functions, effects, and/or supplemental data.

Process 900 includes modifying (at 918) the custom subset of tools, functions, effects, and/or supplemental data that are presented (at 916) in the user interface in response to the set of 3D image data being unselected or the selection changing to include 3D image that represents a different object or material property. Accordingly, the user interface of 3D image editing system 200 dynamically changes as different data points or 3D image data are selected and/or interacted with.

Figure 10:
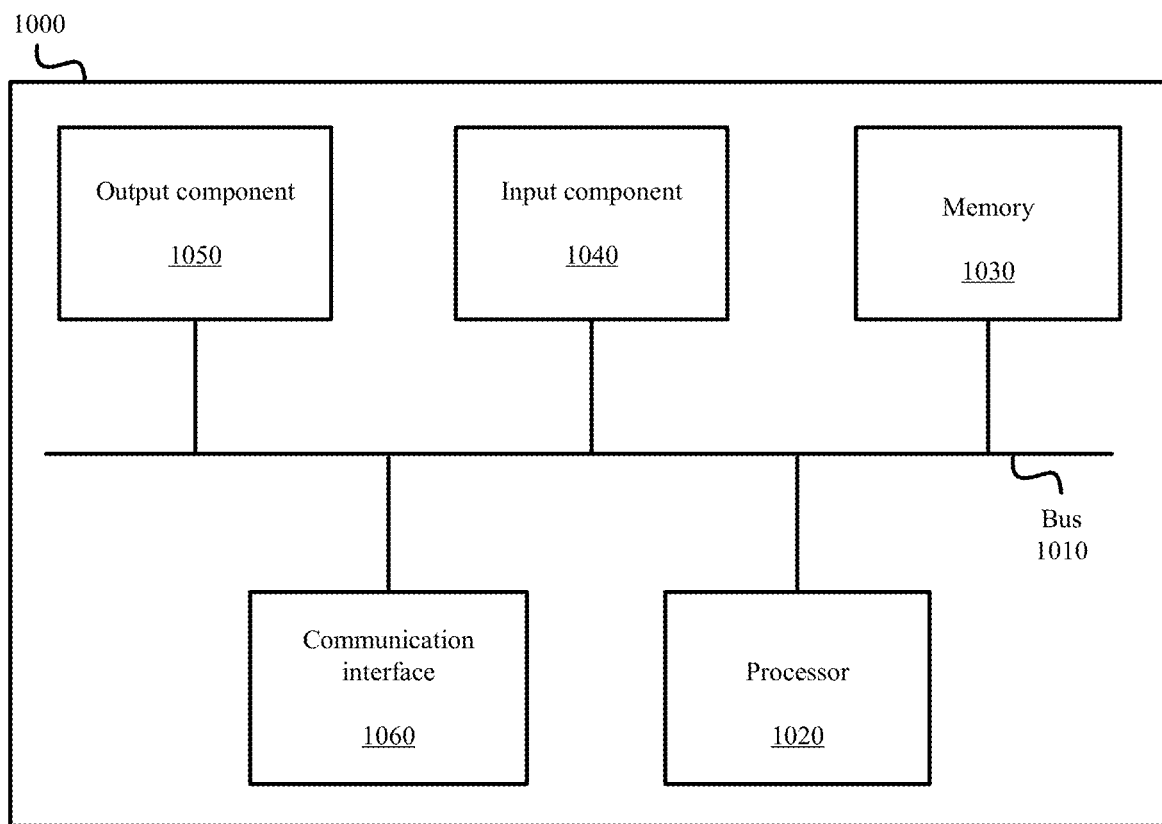
FIG. 10 illustrates example components of one or more devices, according to one or more embodiments described herein.

FIG. 10 is a diagram of example components of device 1000. Device 1000 may be used to implement one or more of the devices or systems described above (e.g., 3D image editing system 200). Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, or processing logic that may interpret and execute instructions. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000, such as a keyboard, a keypad, a button, a switch, etc. Output component 1050 may include a mechanism that outputs information to the operator, such as a display, a speaker, one or more LEDs, etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations relating to one or more processes described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:
1. A method comprising:
receiving a plurality of three-dimensional ("3D") image data that is distributed across a 3D space;

selecting a first set of 3D image data from the plurality of 3D image data in response to a user input;

adjusting a transparency of a second set of 3D image data from the plurality of 3D image data in response to the user input causing a selection of the first set of 3D image data, wherein the second set of 3D image data is not selected with the user input, surrounds the first set of 3D image data, and does not include any 3D image data that is part of the first set of 3D image data, and wherein the user input does not specify a transparency adjustment for the second set of 3D image data; and presenting a visualization that automatically differentiates the selection of the first set of 3D image data from the second set of 3D image data that is not selected, wherein presenting the visualization comprises:

rendering the first set of 3D image data according to an original size, position, and visual characteristics defined for the first set of 3D image data; and performing a partial or fully transparent rendering of the second set of 3D image data as a result of adjusting the transparency of the second set of 3D image data.

2. The method of claim 1, wherein rendering the first set of 3D image data comprises generating a fully opaque visualization of the first set of 3D image data.

3. The method of claim 1,
wherein the first set of 3D image data comprises a first set of data points within a point cloud;
wherein the second set of 3D image data comprises a second set of data points within the point cloud; and
wherein presenting the visualization further comprises displaying the first set of data points with no transparency and the second set of data points with partial or full transparency in response to the user input that selects the first set of 3D image data.

4. The method of claim 1, wherein adjusting the transparency comprises:
increasing the transparency of the second set of 3D image data from being rendered as fully opaque regions of the visualization to being rendered as partially or fully transparent regions of the visualization.

5. The method of claim 1 further comprising:
receiving a selection of a particular region within the 3D space as the user input; and
determining that the first set of 3D image data is within the particular region and that the second set of 3D image data is outside the particular region.

6. The method of claim 1 further comprising:
receiving an edit;
applying the edit to the first set of 3D image data in response to said selecting of the first set of 3D image data; and
updating the visualization to present a rendering of the first set of 3D image data after being modified by the edit and a partially or fully transparent rendering of the second set of 3D image data that does not obscure the rendering of the first set of 3D image data.

7. The method of claim 1,
wherein the second set of 3D image data is positioned in front of the first set of 3D image data in the 3D space; and
wherein performing the partial or fully transparent rendering of the second set of 3D image data comprises rendering the second set of 3D image data to be partially or fully transparent so that the rendering of the first set of 3D image data is not obscured by the second set of 3D image data that is positioned in front of the first set of 3D image data.

8. The method of claim 1 further comprising:
determining a subset of the first set of 3D image data that border a selection of the first set of 3D image data; and
visually differentiating the subset of the first set of 3D image data from other 3D image data within the first set of 3D image data in response to said determining.

9. The method of claim 8, wherein visually differentiating the subset of the first set of 3D image data comprises:
defining a visual border around the subset of the first set of 3D image data.

10. The method of claim 9, wherein defining a visual border comprises:
adding a line that connects the subset of the first set of 3D image data representing different faces of the selection.

11. The method of claim 8, wherein visually differentiating the subset of the first set of 3D image data comprises:
adding a visual cue to the subset of the first set of 3D image data, wherein the visual cue comprises a halo or glow that is added around the subset of the first set of 3D image data.

12. The method of claim 1 further comprising:
classifying the first set of 3D image data based on one or more positions and visual characteristics that are defined for the first set of 3D image data;
presenting a first set of tools in response to classifying the first set of 3D image data as a first object or a first material property; and
presenting a different second set of tools in response to classifying the first set of 3D image data as a second object or a second material property.

13. The method of claim 1 further comprising:
changing edit operations that are accessible in a user interface in response to selecting the first set of 3D image data.

14. The method of claim 1 further comprising:
enabling a first set of edit operations in response to selecting the first set of 3D image data; and
enabling a different second set of edit operations in response unselecting the first set of 3D image data or changing to a different selection of 3D image data from the plurality of 3D image data.

15. A system comprising:
one or more hardware processors configured to:
receive a plurality of three-dimensional ("3D") image data that is distributed across a 3D space;
select a first set of 3D image data from the plurality of 3D image data in response to a user input;
adjust a transparency of a second set of 3D image data from the plurality of 3D image data in response to the user input causing a selection of the first set of 3D image data, wherein the second set of 3D image data is not selected with the user input, surrounds the first set of 3D image data, and does not include any 3D image data that is part of the first set of 3D image data, and wherein the user input does not specify a transparency adjustment for the second set of 3D image data; and
present a visualization that automatically differentiates the selection of the first set of 3D image data from the second set of 3D image data that is not selected, wherein presenting the visualization comprises:
rendering the first set of 3D image data according to an original size, position, and visual characteristics defined for the first set of 3D image data; and performing a partial or fully transparent rendering of the second set of 3D image data as a result of adjusting the transparency of the second set of 3D image data.

16. The system of claim 15, wherein rendering the first set of 3D image data comprises generating a fully opaque visualization of the first set of 3D image data.

17. The system of claim 15,
wherein the first set of 3D image data comprises a first set of data points within a point cloud;
wherein the second set of 3D image data comprises a second set of data points within the point cloud; and
wherein presenting the visualization further comprises displaying the first set of data points with no transparency and the second set of data points with partial or full transparency in response to the user input that selects the first set of 3D image data.

18. The system of claim 15, wherein adjusting the transparency comprises:
increasing the transparency of the second set of 3D image data from being rendered as fully opaque regions of the visualization to being rendered as partially or fully transparent regions of the visualization.

19. The system of claim 15, wherein the one or more hardware processors are further configured to:
receive a selection of a particular region within the 3D space as the user input; and
determine that the first set of 3D image data is within the particular region and that the second set of 3D image data is outside the particular region.

20. A non-transitory computer-readable medium storing program instructions that, when executed by one or more hardware processors of a three-dimensional ("3D") image editing system, cause the 3D image editing system to perform operations comprising:
receive a plurality of 3D image data that is distributed across a 3D space;
select a first set of 3D image data from the plurality of 3D image data in response to a user input;
adjust a transparency of a second set of 3D image data from the plurality of 3D image data in response to the user input causing a selection of the first set of 3D image data, wherein the second set of 3D image data is not selected with the user input, surrounds the first set of 3D image data, and does not include any 3D image data that is part of the first set of 3D image data, and wherein the user input does not specify a transparency adjustment for the second set of 3D image data; and
present a visualization that automatically differentiates the selection of the first set of 3D image data from unselected 3D image data that is not selected, wherein presenting the visualization comprises:
rendering the first set of 3D image data according to an original size, position, and visual characteristics defined for the first set of 3D image data; and
performing a partial or fully transparent rendering of the second set of 3D image data as a result of adjusting the transparency of the second set of 3D image data.

\* \* \* \* \*